(12) United States Patent
Settelmayer

(10) Patent No.: US 12,109,980 B2
(45) Date of Patent: *Oct. 8, 2024

(54) GRIPPING ARM FOR A BICYCLE CARRIER WITH A RATCHETING MECHANISM

(71) Applicant: Thule Sweden AB, Hillerstorp (SE)

(72) Inventor: Joseph Settelmayer, McKinleyville, CA (US)

(73) Assignee: Thule Sweden AB, Hillerstorp (SE)

( * ) Notice: Subject to any disclaimer, the term of this patent is extended or adjusted under 35 U.S.C. 154(b) by 175 days.

This patent is subject to a terminal disclaimer.

(21) Appl. No.: 17/528,624

(22) Filed: Nov. 17, 2021

(65) Prior Publication Data

US 2022/0073008 A1    Mar. 10, 2022

Related U.S. Application Data

(63) Continuation of application No. 17/271,892, filed as application No. PCT/IB2019/056901 on Aug. 14, 2019, now Pat. No. 12,049,198, which is a continuation of application No. 16/116,560, filed on Aug. 29, 2018, now Pat. No. 10,688,939.

(51) Int. Cl.
*B60R 9/10* (2006.01)
*B62H 3/06* (2006.01)

(52) U.S. Cl.
CPC . *B60R 9/10* (2013.01); *B62H 3/06* (2013.01)

(58) Field of Classification Search
CPC .......... B60R 9/10; Y10S 224/924; B62H 3/06
USPC ....................................................... 224/924
See application file for complete search history.

(56) References Cited

U.S. PATENT DOCUMENTS

| 3,355,028 | A | 11/1967 | Mork |
| 3,529,737 | A | 9/1970 | Daugherty |
| 3,843,001 | A | 10/1974 | Willis |
| 3,861,533 | A | 1/1975 | Radek |
| 4,524,893 | A | 6/1985 | Cole |
| 4,852,779 | A | 8/1989 | Berg |
| 5,692,659 | A | 12/1997 | Reeves |
| 5,833,074 | A * | 11/1998 | Phillips ..................... B60R 9/10 |
| | | | 211/21 |
| 6,053,336 | A | 4/2000 | Reeves |
| 6,244,483 | B1 | 6/2001 | McLemore et al. |

(Continued)

FOREIGN PATENT DOCUMENTS

| JP | 2012035788 A | 2/2012 |
| WO | 2003008236 A1 | 1/2003 |

OTHER PUBLICATIONS

1UP Bike Rack Review, Jonathan Marshall, YouTube Video (screenshots), https://www.youtube.com/watch?v=-VFPIjYwU3M, dated Dec. 23, 2017 (Year: 2017).*

(Continued)

*Primary Examiner* — Scott T McNurlen
(74) *Attorney, Agent, or Firm* — Sterne, Kessler, Goldstein & Fox P.L.L.C.

(57) ABSTRACT

A bicycle carrier includes a base configured to support a bicycle, a wheel securement arm, and a connection assembly. The wheel securement arm has a free end and a fixed end. The fixed end is rotatably coupled to the base. The connection assembly is coupled to the wheel securement arm and fixed to the base. The connection assembly is configured to rotate the wheel securement arm about the base.

22 Claims, 19 Drawing Sheets

(56) References Cited

U.S. PATENT DOCUMENTS

| | | | |
|---|---|---|---|
| 6,439,397 B1* | 8/2002 | Reeves | B60R 9/10 224/924 |
| 6,460,743 B2 | 10/2002 | Edgerly et al. | |
| 7,044,347 B1 | 5/2006 | Pedrini | |
| 7,694,830 B1 | 4/2010 | Larson | |
| 8,286,843 B2* | 10/2012 | Bogoslofski | B60R 9/10 224/532 |
| 9,956,922 B2 | 5/2018 | Phillips | |
| 10,150,424 B1 | 12/2018 | Phillips | |
| 2002/0125279 A1 | 9/2002 | Edgerly et al. | |
| 2003/0071097 A1 | 4/2003 | Dean | |
| 2003/0132259 A1 | 7/2003 | McLemore et al. | |
| 2003/0209582 A1 | 11/2003 | Reeves | |
| 2004/0238582 A1 | 12/2004 | Pedrini | |
| 2006/0273126 A1 | 12/2006 | Pedrini | |
| 2007/0069534 A1 | 3/2007 | Morrill et al. | |
| 2007/0164065 A1 | 7/2007 | Davis | |
| 2008/0099522 A1 | 5/2008 | Clausen et al. | |
| 2008/0164292 A1 | 7/2008 | Farney | |
| 2009/0120984 A1 | 5/2009 | Sautter et al. | |
| 2011/0240700 A1 | 10/2011 | Williams | |
| 2015/0076200 A1 | 3/2015 | Pedrini | |
| 2015/0197204 A1 | 7/2015 | Shen | |
| 2017/0349111 A1* | 12/2017 | Ramsdell | B60R 9/06 |
| 2018/0050645 A1 | 2/2018 | Phillips | |
| 2018/0072237 A1 | 3/2018 | Kuschmeader et al. | |
| 2018/0134230 A1 | 5/2018 | Phillips | |

OTHER PUBLICATIONS

1UP Bike Rack Review, Jonathan Marshall, YouTube Video (screenshot), https://www.youtube.com/watch?v=-VFPIjYwU3M, dated Dec. 23, 2017 (Year: 2017).*

International Search Report and Written Opinion for International Application No. PCT/IB2019/056901, European Patent Office (EPO), Berlin, dated Nov. 15, 2019, 9 pages.

"Inno INH305/INH306 Tire Hold Hitch Bike Rack Review & How-To Video," ORS Racks Direct, YouTube Video (screenshots), dated Jul. 23, 2013, 5 pages.

"INH305 Tire Hold Hitch Instruction Manual," Inno Advanced Car Racks / Car Mate USA, dated Feb. 22, 2016, 8 pages.

"1UP Bike Rack Review," Jonathan Marshall, YouTube Video (screenshots), dated Dec. 23, 2017, 6 pages.

Third-Party Submission under 37 CFR 1.290 in U.S. Appl. No. 17/271,892, dated Oct. 21, 2021, 53 pages.

* cited by examiner

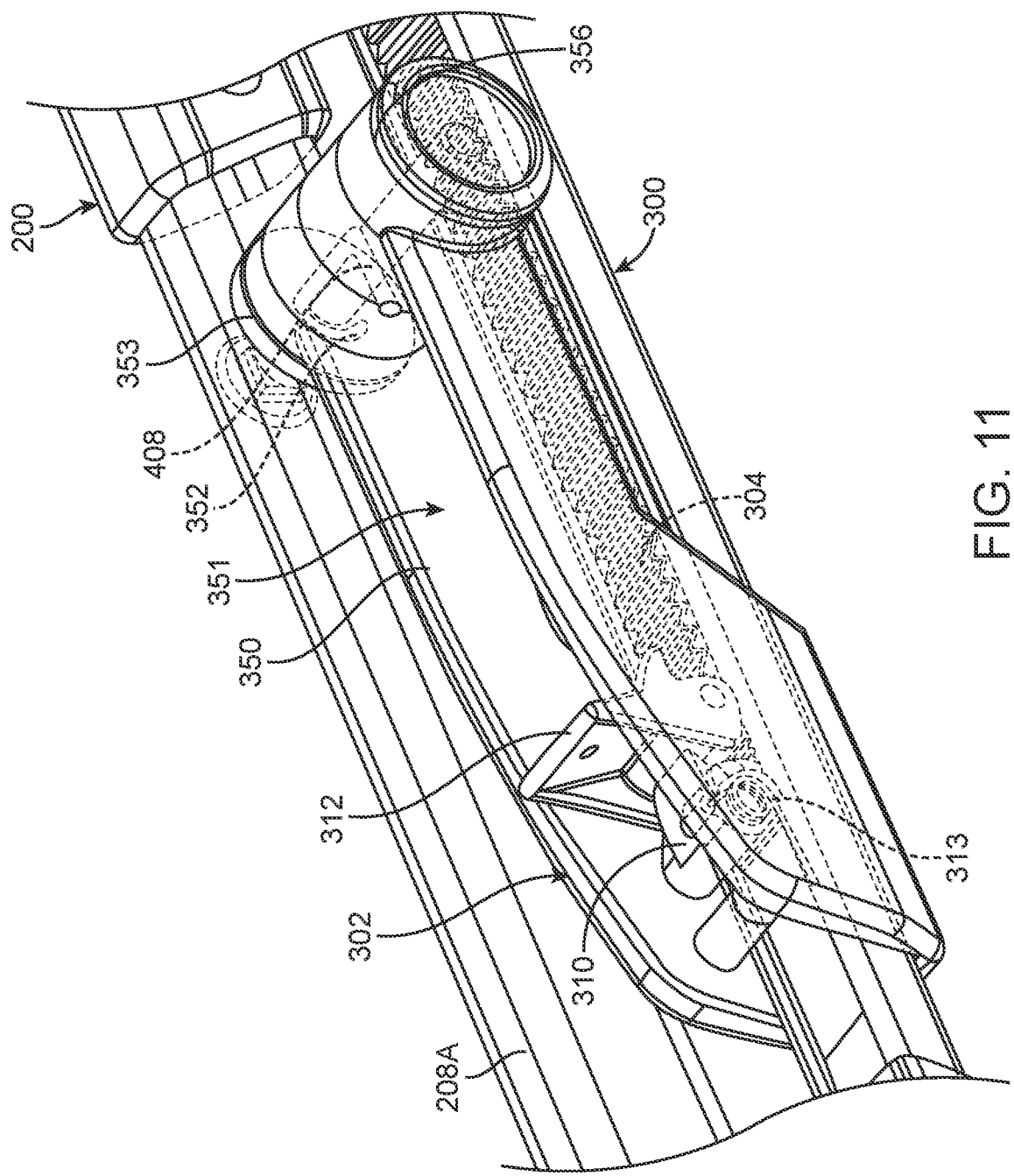

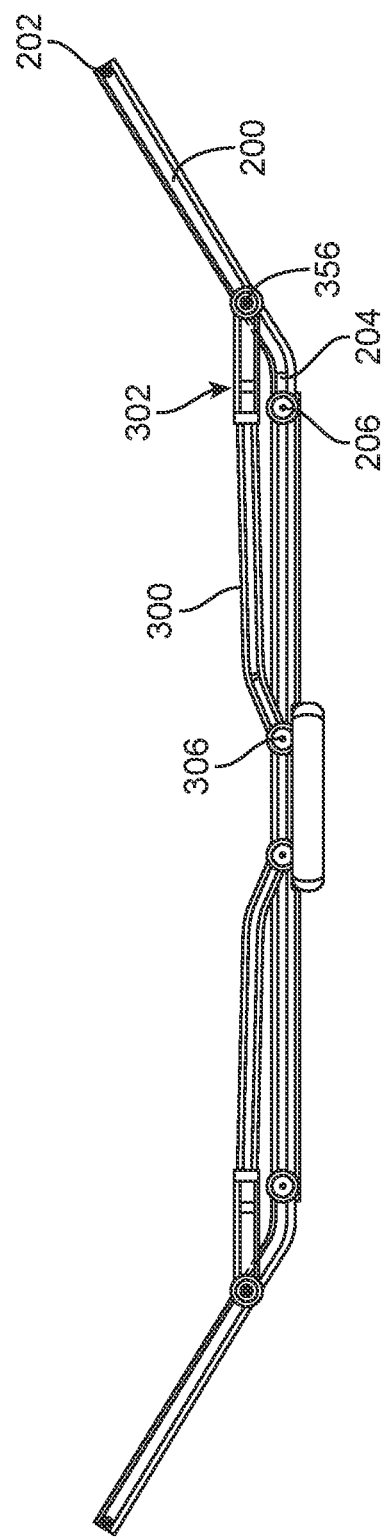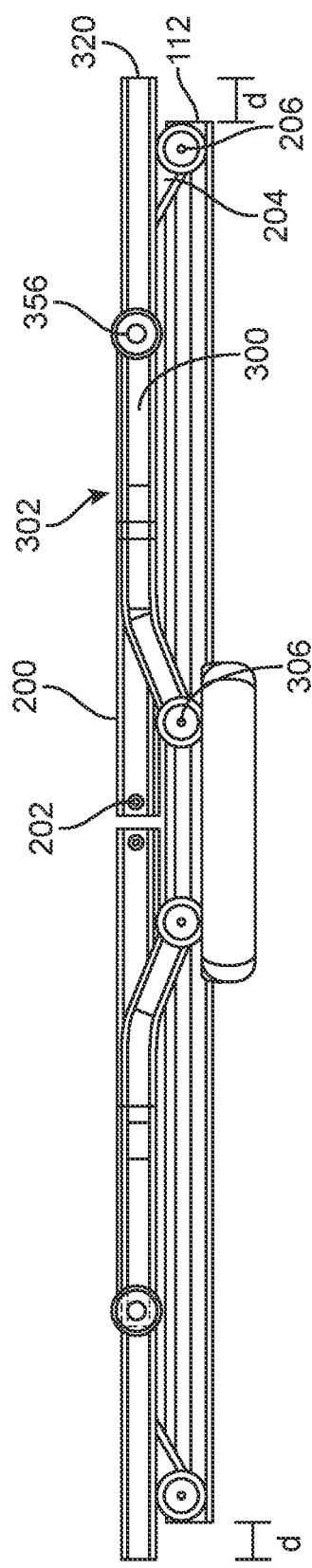

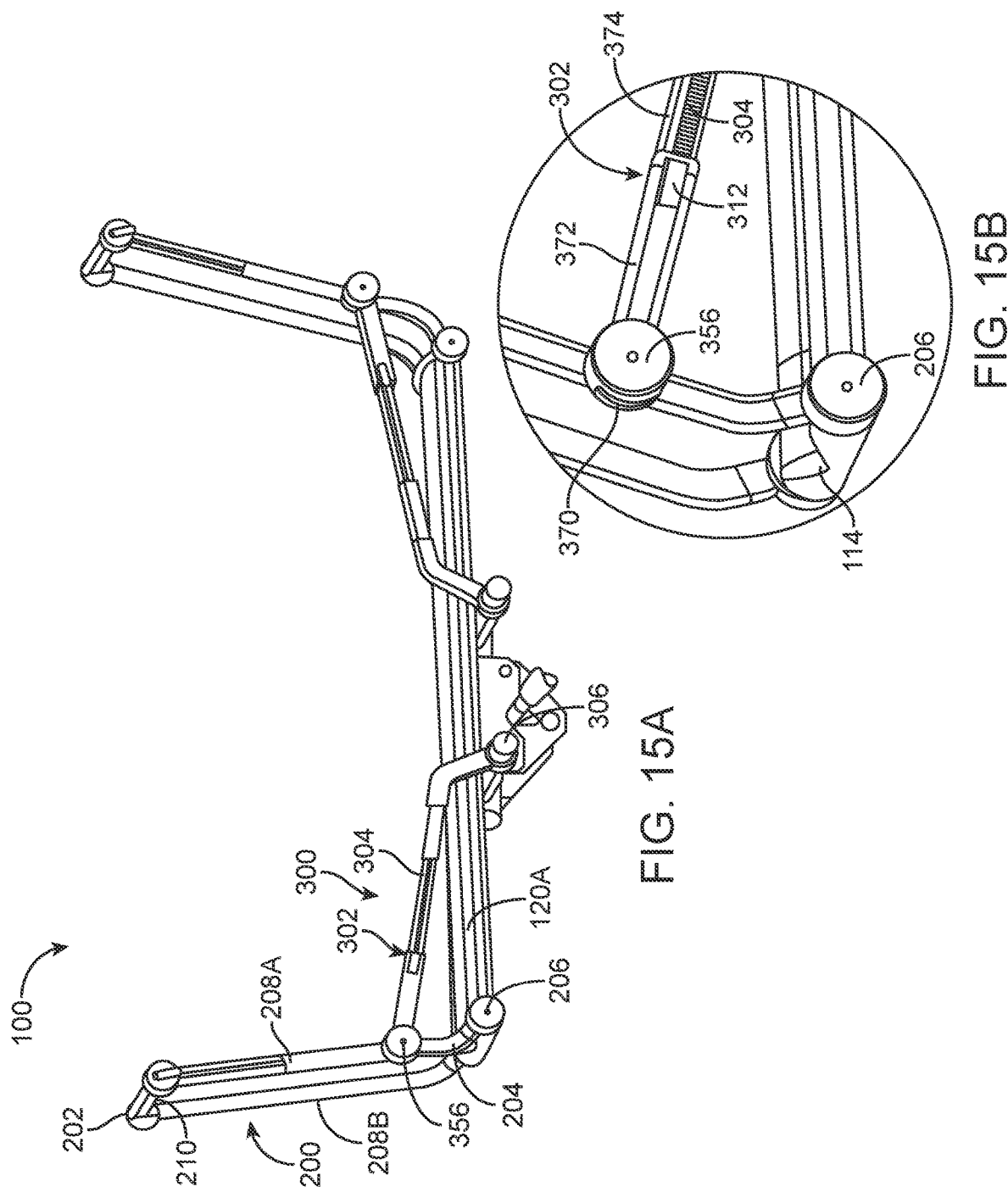

GRIPPING ARM FOR A BICYCLE CARRIER WITH A RATCHETING MECHANISM

CROSS REFERENCE TO RELATED APPLICATIONS

This application is a continuation of U.S. application Ser. No. 17/271,892, filed Feb. 26, 2021, which is a National Stage Entry of International Application No. PCT/IB2019/056901, filed Aug. 14, 2019, which is a continuation of U.S. application Ser. No. 16/116,560, filed Aug. 29, 2018, which are hereby incorporated herein in their entireties by reference.

BACKGROUND

Field

The present disclosure relates to bicycle carriers. More specifically, embodiments of the present disclosure relate to bicycle carriers having a wheel gripping arm with a ratcheting mechanism.

Background

Bicycle carriers for carrying bicycles on a vehicle can be used to transport bicycles from one place to another. In some examples, the bicycle carrier can be secured to the vehicle safely and conveniently via a hitch, typically attached to rear of the vehicle. Various mechanisms can be used to secure the bicycle to the bicycle carrier, for example straps and securement arms. However, these devices can be cumbersome and difficult to use or fail to securely fasten the bicycle to the bicycle carrier in a sufficient manner.

BRIEF SUMMARY

In some embodiments, a bicycle carrier includes a base configured to support a bicycle, the base having a first end and a second end, a wheel securement arm having a free end and a fixed end, wherein the fixed end is coupled to the first end of the base at a first joint such that the wheel securement arm is rotatably coupled to the base, and a ratchet arm having a ratcheting assembly, the ratchet arm coupled to the wheel securement arm and rotatably coupled to the base at a second joint. In some embodiments, the bicycle carrier includes an actuation member disposed at the free end of the wheel securement arm and coupled to the ratcheting assembly. In some embodiments, the actuation member is a handle. In some embodiments, the bicycle carrier includes a linkage and the actuation member is coupled to the ratcheting assembly by the linkage. In some embodiments, the linkage is a cable.

In some embodiments, the ratcheting assembly includes a pawl coupled to the actuation member and a toothed surface coupled to the ratchet arm. In some embodiments, the toothed surface is disposed on an exterior surface of the ratchet arm.

In some embodiments, the ratchet arm is coupled to the wheel securement arm by a housing. In some embodiments, the ratchet arm is slidably disposed through the housing. In some embodiments, the ratcheting assembly is disposed within the housing. In some embodiments, the ratcheting assembly is disposed within an interior of the ratchet arm.

In some embodiments, the bicycle carrier includes a cable and the actuation member is coupled to the ratcheting assembly by the cable. In some embodiments, the cable is disposed within an interior of the wheel securement arm and an interior of the ratchet arm. In some embodiments, the bicycle carrier includes a housing coupling the wheel securement arm and the ratchet arm. In some embodiments, the housing includes a slot and the cable is disposed through the slot.

In some embodiments, the bicycle carrier includes a second wheel securement arm having a free end and a fixed end. In some embodiments, the fixed end is rotatably coupled to the second end of the base at a third joint. In some embodiments, the bicycle carrier includes a second ratchet arm having a second ratcheting assembly. In some embodiments, the second ratchet arm is coupled to the second wheel securement arm and rotatably coupled to the base at a fourth joint.

In some embodiments, a bicycle carrier includes a base configured to support a bicycle, the base having a distal end, a wheel securement arm rotatably coupled to the first end of the base at a first attachment point, and an adjustment arm rotatably coupled to the base at a second attachment point and coupled to the wheel securement arm at a third attachment point. In some embodiments, the adjustment arm is a ratchet arm. In some embodiments, in a closed configuration, the third attachment point is disposed longitudinally between the first attachment point and the second attachment point. In some embodiments, in a loading configuration, the first attachment point is disposed longitudinally between the second attachment point and the third attachment point. In some embodiments, in the loading configuration, the third attachment point is disposed longitudinally beyond the distal end of the base. In some embodiments, in the closed configuration, a free end of the adjustment arm is disposed longitudinally beyond the distal end of the base. In some embodiments, in the loading configuration, a length of the adjustment arm from the second attachment point to the third attachment point is greater than in the closed configuration.

In some embodiments, a bicycle carrier includes an actuation member disposed at a free end of a wheel securement arm and a ratchet arm coupled to the wheel securement arm at an attachment point. In some embodiments, the ratchet arm includes a ratcheting assembly coupled to the actuation member by a linkage. In some embodiments, the wheel securement arm is configured to rotate in a first direction about the attachment point when the actuation member disengages the ratcheting assembly. In some embodiments, the actuation member includes a handle and the linkage comprises a cable coupled to the handle and a pawl of the ratcheting assembly.

In some embodiments, a method of operating a bicycle carrier includes engaging an actuation member disposed at a free end of a wheel securement arm. In some embodiments, engaging the actuation member disengages a ratcheting assembly coupled to a ratchet arm. In some embodiments, the method includes rotating the wheel securement arm in a first direction about an attachment point. In some embodiments, the method includes releasing the actuation member. In some embodiments, releasing the actuation member engages the ratcheting assembly thereby locking the wheel securement arm in place. In some embodiments, rotating the wheel securement arm in the first direction increases a length of the ratchet arm.

In some embodiments, the method includes disposing a bicycle on a base of the bicycle carrier. In some embodiments, a wheel of the bicycle is disposed between the base and the wheel securement arm. In some embodiments, the method includes rotating the wheel securement arm in a second direction to contact the bicycle wheel with the wheel securement arm.

BRIEF DESCRIPTION OF THE DRAWINGS/FIGURES

The accompanying drawings, which are incorporated herein and form a part of the specification, illustrate the embodiments and, together with the description, further serve to explain the principles of the embodiments and to enable a person skilled in the relevant art(s) to make and use the embodiments.

FIG. 11 illustrates a ratcheting assembly for a bicycle carrier, according to an embodiment.

FIGS. 14A and 14B illustrate a front view of a bicycle carrier, according to an embodiment.

FIG. 15A illustrates a bicycle carrier, according to an embodiment.

FIG. 15B illustrates a portion of a bicycle carrier, according to an embodiment.

Figure 1:
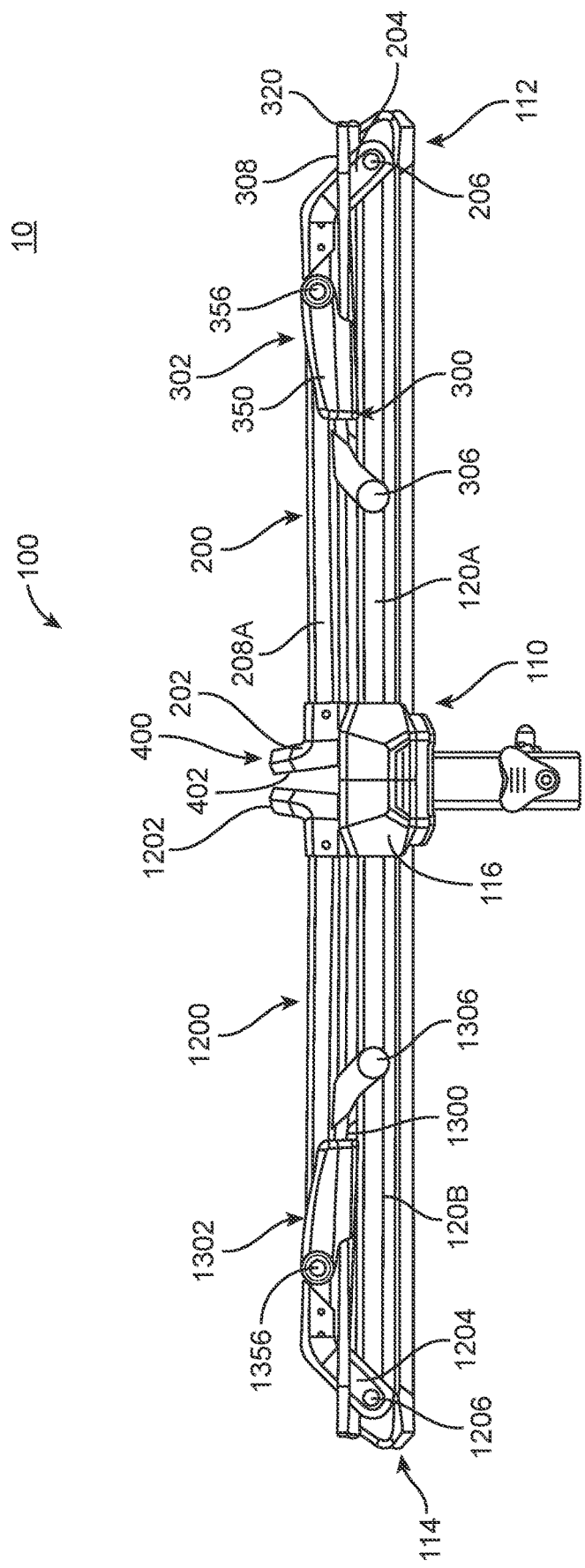
FIG. 1 illustrates a front view of a bicycle carrier in a closed position, according to an embodiment.

The features and advantages of the embodiments will become more apparent from the detail description set forth below when taken in conjunction with the drawings, in which like reference characters identify corresponding elements throughout. In the drawings like reference numbers generally indicate identical, functionally similar, and/or structurally similar elements.

DETAILED DESCRIPTION

Embodiments of the present disclosure are described in detail with reference to embodiments thereof as illustrated in the accompanying drawings. References to "one embodiment," "an embodiment," "some embodiments," etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The following examples are illustrative, but not limiting, of the present embodiments. Other suitable modifications and adaptations of the variety of conditions and parameters normally encountered in the field, and which would be apparent to those skilled in the art, are within the spirit and scope of the disclosure.

Embodiments of the bicycle carriers 100 disclosed herein can be used to secure one or more bicycles to a vehicle. It is important to securely mount a bicycle onto the bicycle carrier to reduce motion forces imparted on the bicycle that can result in damage. Therefore, it is important to have a bicycle carrier that is adjustable for different sizes of bicycles and wheels. It is also important for the user to be able to quickly and easily manipulate the bicycle carrier during loading, securement, and unloading of the bicycle(s).

Embodiments of the bicycle carriers 100 disclosed herein can have a wheel securement arm 200 configured to secure a wheel of a bicycle on the bicycle carrier 100. The bicycle carrier 100 can also include a ratchet arm 300, which can be coupled to a base 110 of the bicycle carrier 100 and the wheel securement arm 200. The configuration of wheel securement arm 200 and ratchet arm 300 can facilitate quick and easy securement of a bicycle onto bicycle carrier 100. This can particularly be achieved because of the ratcheting assembly 302 of ratchet arm 300, which provides incremental adjustment to the position of wheel securement arm 200 about the wheel of a bicycle. Additionally, an actuation member 400 disposed conveniently at a free end 202 of wheel securement arm 200 makes it easy for the user to engage and disengage the ratcheting assembly 302 from a location that is readily accessible and ergonomic for the user.

Figure 2:
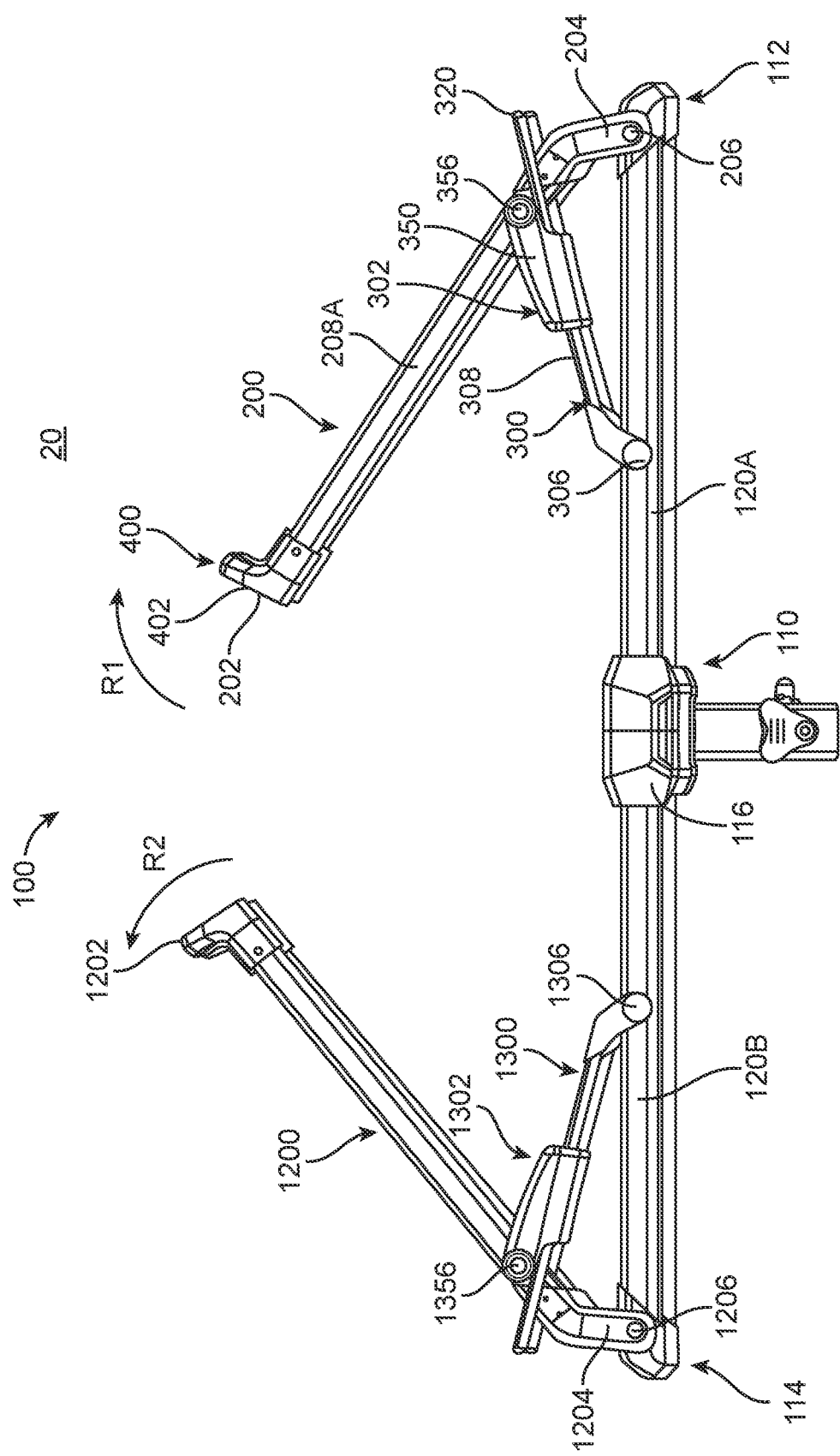
FIG. 2 illustrates a front view of a bicycle carrier in a transition position, according to an embodiment.
Figure 3:
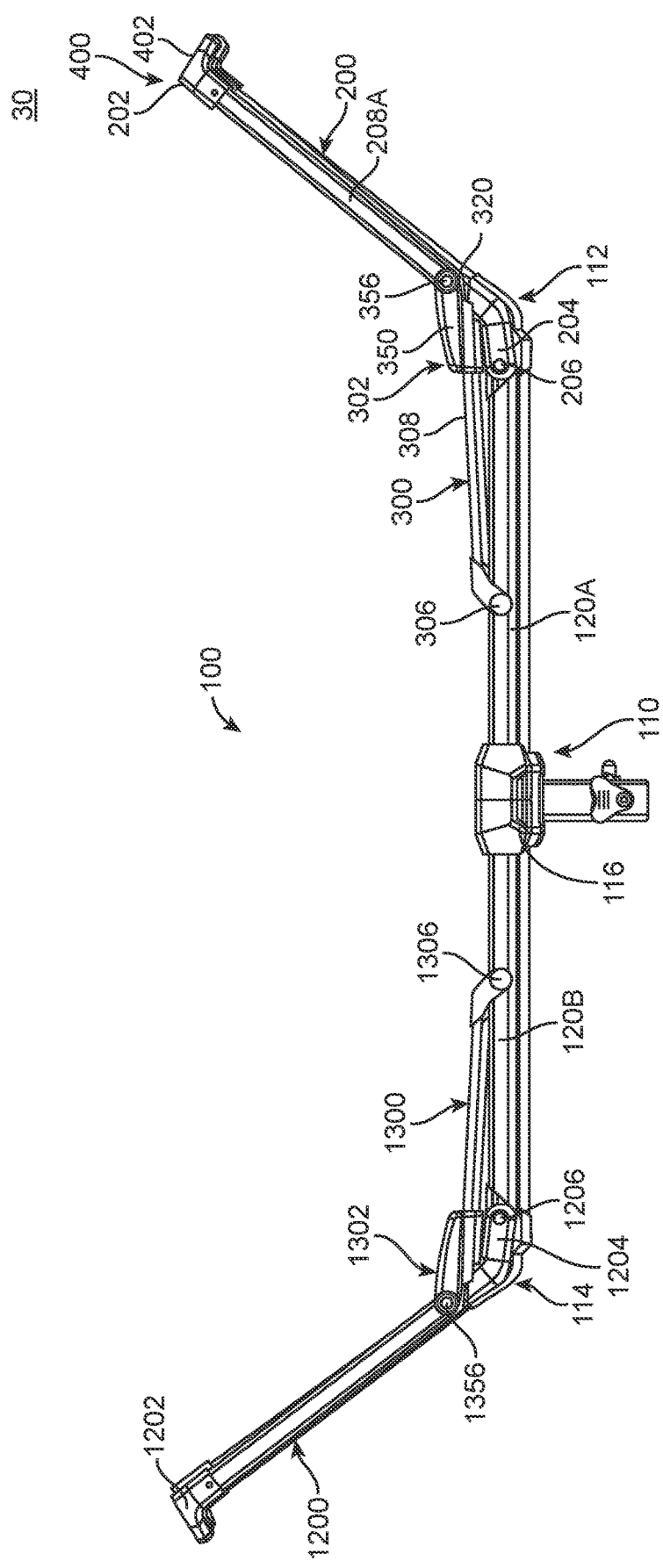
FIG. 3 illustrates a front view of a bicycle carrier in a loading position, according to an embodiment.
Figure 4:
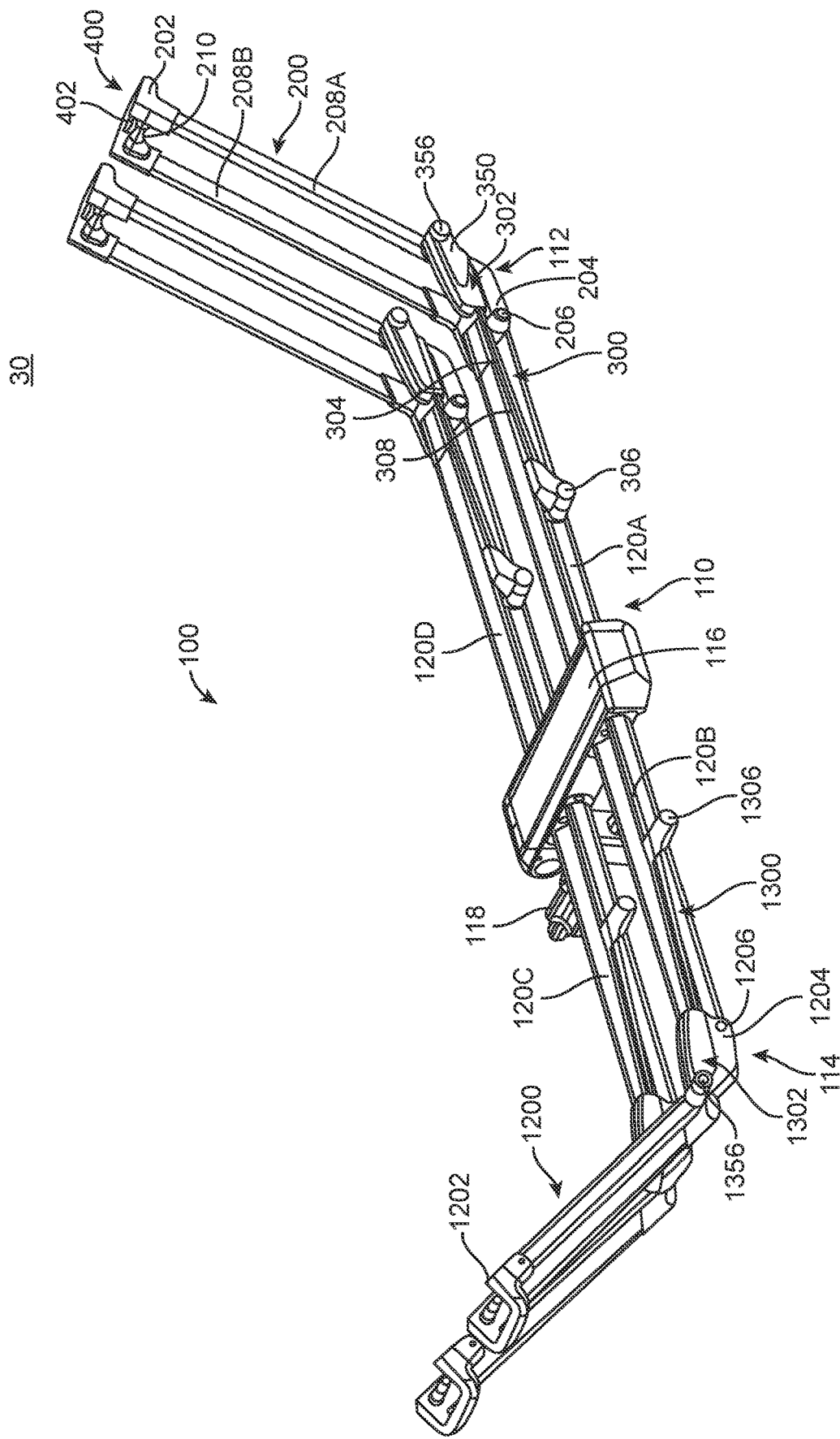
FIG. 4 illustrates a perspective view of a bicycle carrier, according to an embodiment.

By way of example, FIGS. 1-3 illustrate front views of bicycle carrier 100 according to an embodiment. As described herein, the front view refers to a viewpoint looking at the bicycle carrier from behind a vehicle onto which the bicycle carrier is attached. FIG. 1 illustrates bicycle carrier 100 in a closed position 10, where wheel securement arm 200 is folded down so that it is generally parallel with wheel tray 120A of base 110 of bicycle carrier 100. This provides a compact configuration when bicycles are not loaded onto bicycle carrier 100. To open the bicycle carrier 100 for loading bicycles, a user can manipulate, for example, actuation member 400 (e.g., handle 402) and rotate wheel securement arm 200 in direction R1, as illustrated in FIG. 2, which shows bicycle carrier 100 in a transition position 20, as wheel securement arm 200 is rotated from closed position 10 to a loading position 30 shown in FIG. 3 and also in the perspective view of FIG. 4. Similarly, second wheel securement arm 1200 can be rotated in direction R2.

The components and functions described herein for wheel securement arm 200 and ratchet arm 300 coupled to wheel tray 120A are also applicable to the components coupled to wheel trays 120B-D, for example, second wheel securement arm 1200 and second ratchet arm 1300. For example, second wheel securement arm 1200 can have a free end 1202 and a fixed end 1204 that is coupled to wheel tray 120B at fourth joint 1206 near second end 114 of base 110. Also, for example, second ratchet arm 1300 can have a second ratcheting assembly 1302 and be coupled to wheel tray 120B at fifth joint 1306 and to second wheel securement arm 1200 at sixth joint 1356.

Referring to FIGS. 1-4, when actuation member 400 is released, wheel securement arm 200 is prevented from rotating in direction R1 by ratcheting assembly 302, described in detail below. However, ratcheting assembly 302 still permits wheel securement arm 200 to rotate in a direction opposite R1 when actuation member 400 is released, which allows for easy adjustment of wheel securement arm 200 about the wheel of a bicycle. Therefore, once a bicycle is loaded onto bicycle carrier 100 in loading position 30 shown in FIG. 3, wheel securement arm 200 can be rotated in a direction opposite R1 to secure the wheel of the bicycle.

The relative positioning of the joints or attachment points of the wheel securement arm 200 and ratchet arm 300 with each other and with base 110 of bicycle carrier 100 facilitate the ease of adjustment and compact nature of the bicycle carrier. First joint 206 couples wheel securement arm 200 near a first end 112 of base 110. Second joint 306 couples ratchet arm 300 with base 110 at a position between central support beam 116 and first end 112. Third joint 356 couples ratchet arm 300 with wheel securement arm 200.

As shown in FIG. 1, in the closed position 10, third joint 356 is disposed laterally between first joint 206 and second joint 306. As shown in the transition position 20 of FIG. 2, as wheel securement arm 200 is rotated in direction R1, third joint 356 moves laterally closer to first joint 206. And as shown in FIG. 3, in loading position 30, third joint 356 is disposed laterally past first joint 206, such that first joint 206 is disposed laterally between third joint 356 and second joint 306. In some embodiments, third joint 356 can be disposed laterally beyond first end 112 of base 110 in loading position 30.

As shown, for example, in FIGS. 1-4, bicycle carrier 100 can include base 110 having a first end 112, a second end 114, and a central support beam 116. Base 110 of bicycle carrier 100 can be attached to a vehicle, for example, by stinger 118. In some embodiments, bicycle carrier 100 can be a platform-style carrier, for example, with one or more wheel trays 120A-D. In some embodiments, bicycle carrier 100 can be configured to carry one, two, three, four or more bicycles. In the embodiment shown in FIG. 4, for example, the bicycle carrier 100 is configured to carry two bicycles. The wheels of a first bicycle can be disposed in wheel trays 120A and 120B and the wheels of a second bicycle can be disposed in wheel trays 120C and 120D.

As discussed above, bicycle carrier 100 can include wheel securement arm 200, which can include free end 202 and fixed end 204. In some embodiments, fixed end 204 can be coupled with base 110 at a first joint 206. In some embodiments, first joint 206 can be a rotatable connection point such that wheel securement arm 200 can rotate with respect to base 110. In some embodiments, wheel securement arm 200 can include one or more wheel engagement surface 210 configured to contact a wheel of a bicycle. As shown, for example in FIGS. 4-6, in some embodiments, uprights 208A-B spaced apart from each other such that a bicycle wheel can be disposed between uprights 208A-B. In some embodiments, wheel engagement surface 210 can be disposed between uprights 208A-B and configured to contact a surface of the bicycle wheel to secure the bicycle in place on bicycle carrier 100.

Bicycle carrier 100 can also include ratchet arm 300, which can include ratcheting assembly 302, described in more detail below. In some embodiments, ratchet arm 300 can be coupled to base 110, for example, to wheel tray 120A at second joint 306. In some embodiments, second joint 306 can be a rotatable joint such that ratchet arm 300 can rotate with respect to base 110. In some embodiments, ratchet arm 300 can also be coupled to wheel securement arm 200, for example, at third joint 356. In some embodiments, ratchet arm 300 can be an adjustment arm with an adjustment mechanism other than ratcheting assembly 302. For example, the adjustment arm with adjustment mechanism can include, without limitation, gears, pulleys, pins (e.g., spring pins) with corresponding holes or notches, interference wedges, etc. The purpose of the adjustment mechanism is to provide incremental rotational positioning of the wheel securement arm 200.

Figure 9:
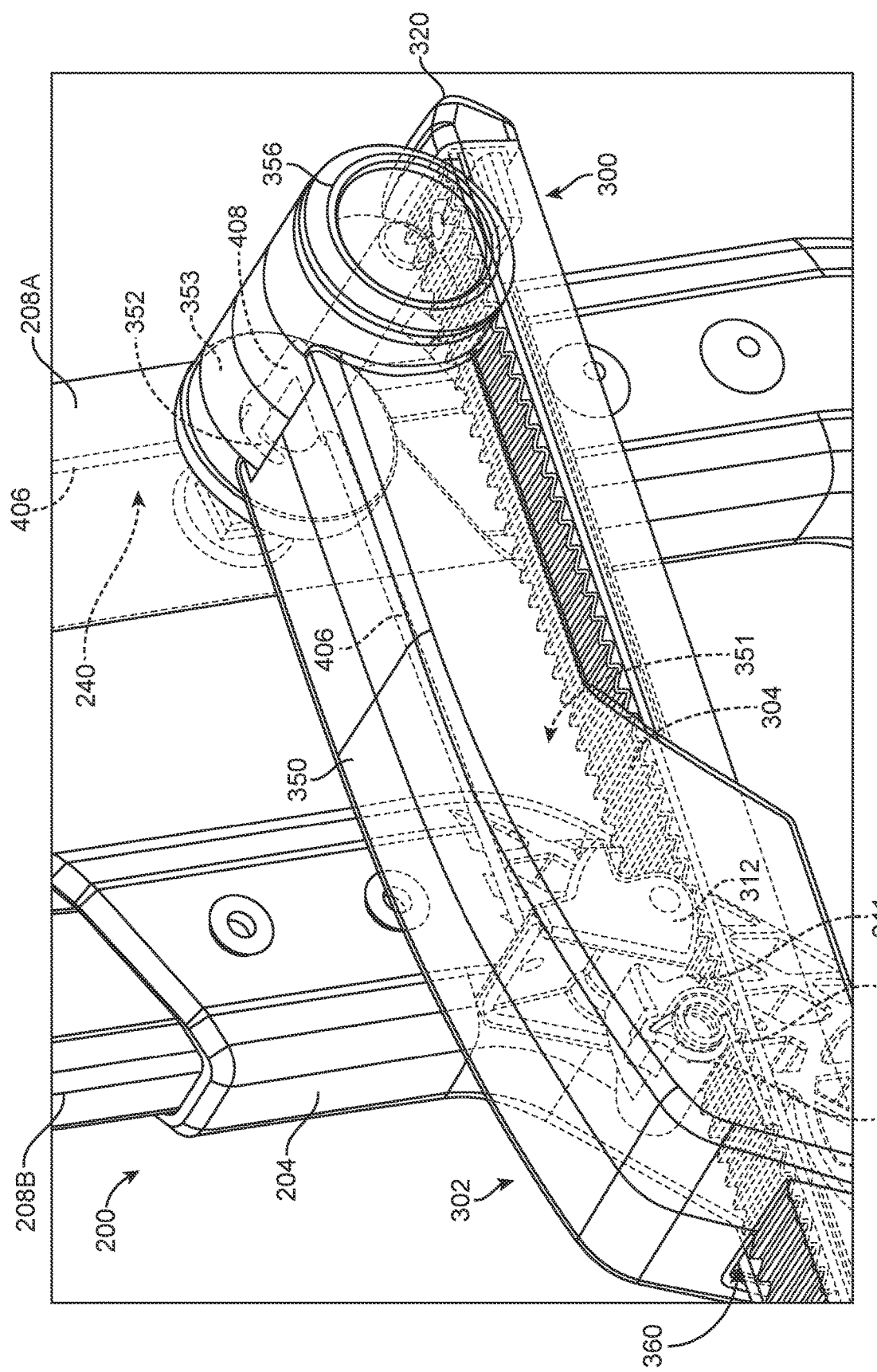
FIG. 9 illustrates a ratcheting assembly for a bicycle carrier, according to an embodiment.

In some embodiments, housing 350 can be coupled to ratchet arm 300. In some embodiments, housing 350 can also be coupled to wheel securement arm 200. In some embodiments, housing 350 can house ratcheting assembly 302 at least partially within housing 350. For example, at least a portion of ratcheting assembly 302 can be disposed within an interior 351 of housing 350, as shown, for example, in FIGS. 6 and 9. In some embodiments, housing 350 can have a top opening 354 such that an interior 351 of housing 350 is exposed (see FIG. 6). In some embodiments, housing 350 can cover ratcheting assembly 302 within an interior 351 of housing 350 (see FIGS. 4 and 9). As wheel securement arm 200 is rotated, housing 350 translates along ratchet arm 300.

Bicycle carrier 100 can also include actuation member 400, which can be configured to engage and disengage ratcheting assembly 302. In some embodiments, actuation member 400 can be disposed at or near free end 202 of wheel securement arm 200. In some embodiments, actuation member 400 can be a handle 402 (see FIG. 6) or a button 403 (see FIG. 12A). Other mechanisms such as knobs, levers, etc. can be used for actuation member 400. In some embodiments, actuation member 400 can be coupled with ratcheting assembly 302 by a linkage 404, for example, cable 406.

Figure 6:
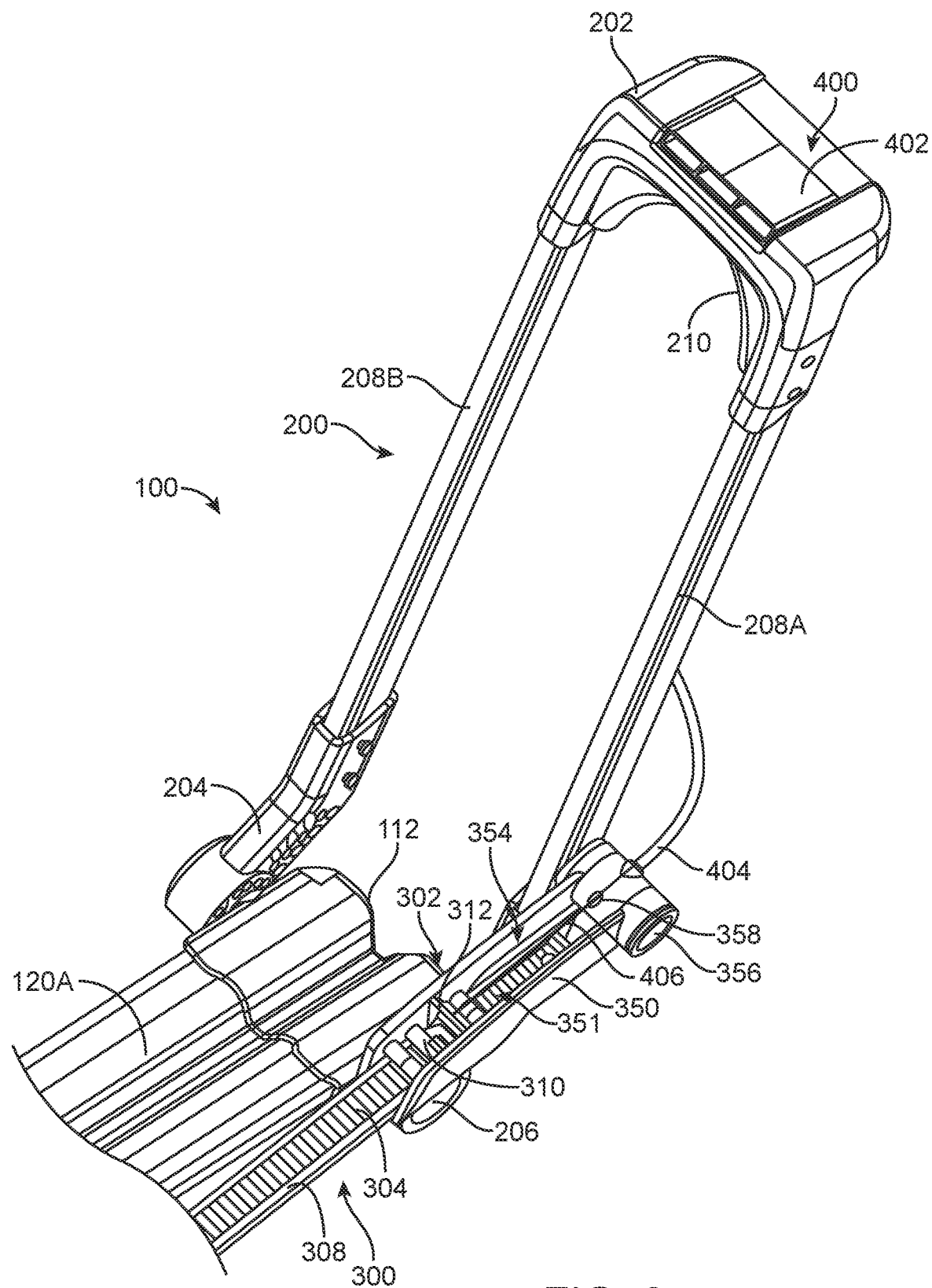
FIG. 6 illustrates a perspective view of a portion of a bicycle carrier, according to an embodiment.

As shown, for example, in FIG. 6, in some embodiments, actuation member 400 can be a handle 402 such that when handle 402 is displaced, ratcheting assembly 302 is disengaged, allowing wheel securement arm 200 to rotate. Disposing actuation member 400 at free end 202 of wheel securement arm 200 provides easy accessibility for the user. And the handle 402 mechanism shown in FIG. 6 allows the user to ergonomically grip the handle 402 and pull it while rotating wheel securement arm 200 to keep ratcheting assembly 302 disengaged. In some embodiments, handle 402 can slide along an upper surface at free end 202.

Figure 5:
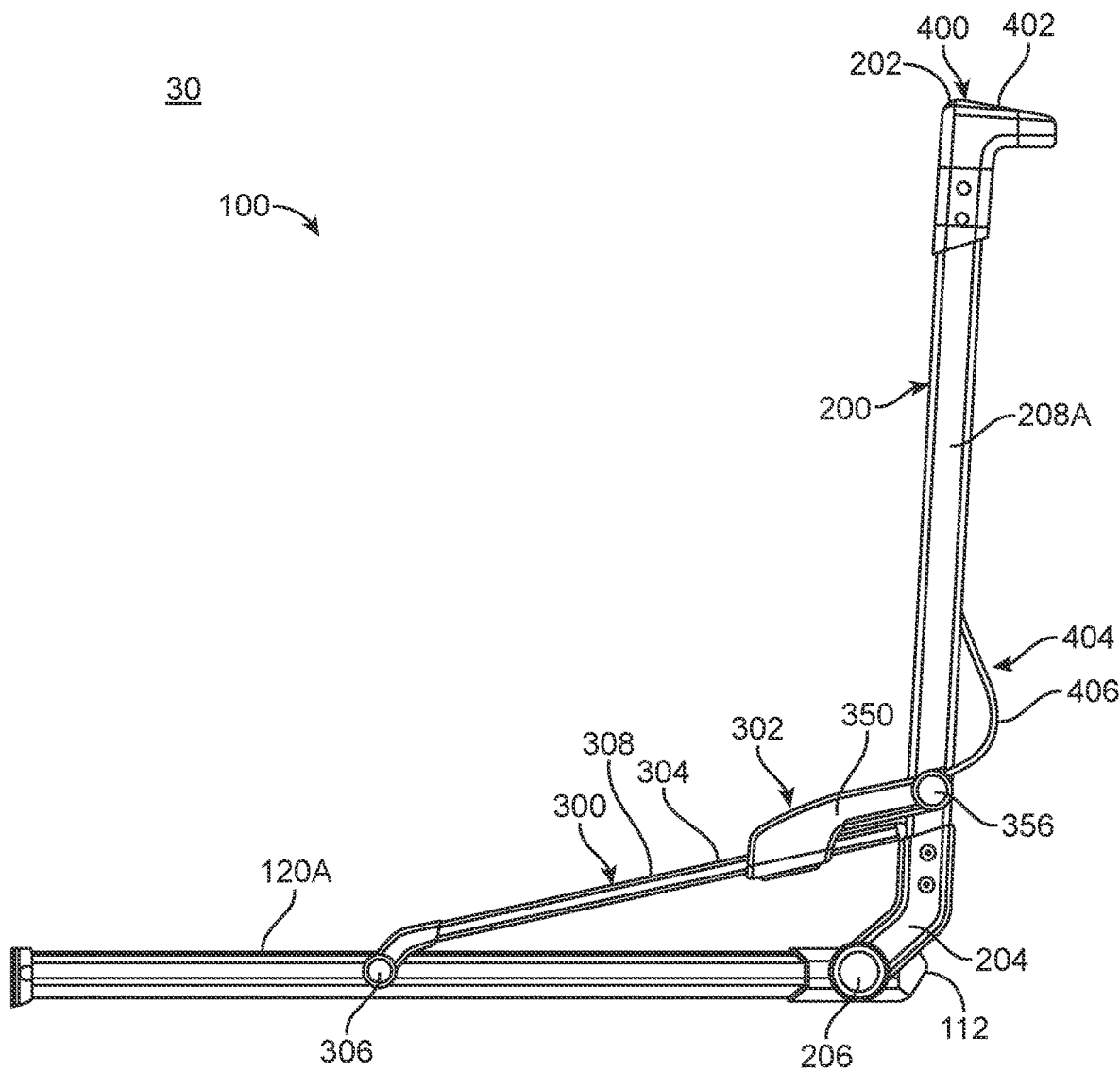
FIG. 5 illustrates a front view of a portion of a bicycle carrier, according to an embodiment.

Handle 402 can be coupled to ratcheting assembly 302, for example, by cable 406. Materials for cable 406 include, but are not limited to, metal, plastic, fabric, or any combination thereof. For example, in some embodiments, cable 406 can be a braided steel cable. In some embodiments, as shown in FIGS. 5 and 6, cable 406 can be disposed exterior to wheel securement arm 200 for ease of manufacturing. In some embodiments, ratcheting assembly 302 can be disposed at least partially within housing 350. Thus, in some embodiments, cable 406 can be disposed through a passage 358 in housing 350 in order to couple to ratcheting assembly 302.

Figure 7A:
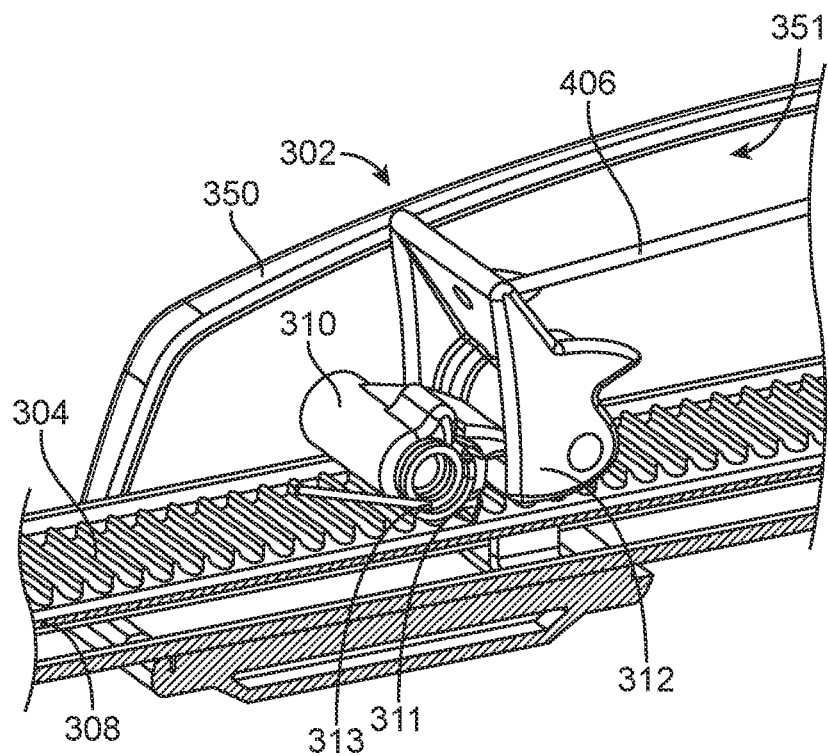
FIGS. 7A and 7B illustrate a ratcheting assembly for a bicycle carrier, according to an embodiment.
Figure 7B:
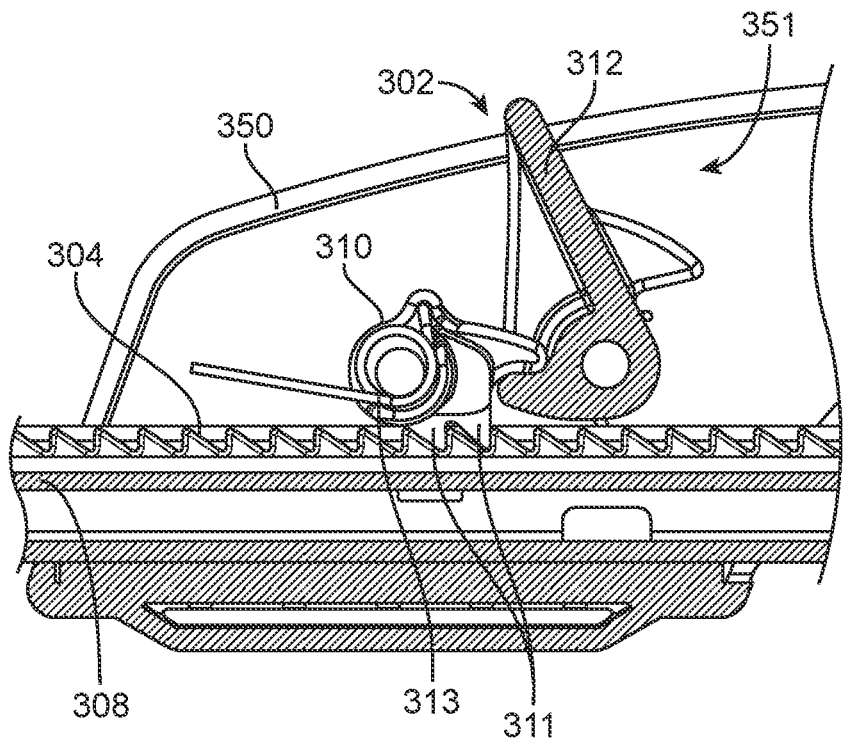

FIGS. 7A and 7B illustrate a perspective view and side cross-sectional view, respectively, of ratcheting assembly 302, according to an embodiment. In FIGS. 7A and 7B, ratcheting assembly 302 is in an engaged configuration, where actuation member 400 is not being operated. In some embodiments, ratcheting assembly 302 can include pawl 310, which can have one or more teeth 311 configured to engage with a toothed surface 304 of ratchet arm 300. For example, an exterior surface 308 of ratchet arm 300 can include the toothed surface 304 as either an integral or separate component. In some embodiments, ratcheting assembly 302 can include spring 313 configured to bias pawl 310 into engagement with toothed surface 304. In some embodiments, ratcheting assembly 302 can include release 312 which can be coupled to pawl 310. In some embodiments, release 312 can be coupled to, for example, cable 406 or other linkage 404, which can in turn be coupled with the actuation member 400. Thus, as shown in FIGS. 7A and 7B, when actuation member 400 is not being operated, rotation of wheel securement arm 200 in direction R1 (see FIG. 2) can be prevented be the interaction of teeth 311 on pawl 310 with the toothed surface 304 of ratchet arm 300. However, rotation of wheel securement arm 200 is permitted in the direction opposite R1. Incremental adjustments associated with the spacing of the teeth on toothed surface 304 can be made to firmly secure the wheel of the bicycle on bicycle carrier 100.

Figure 8A:
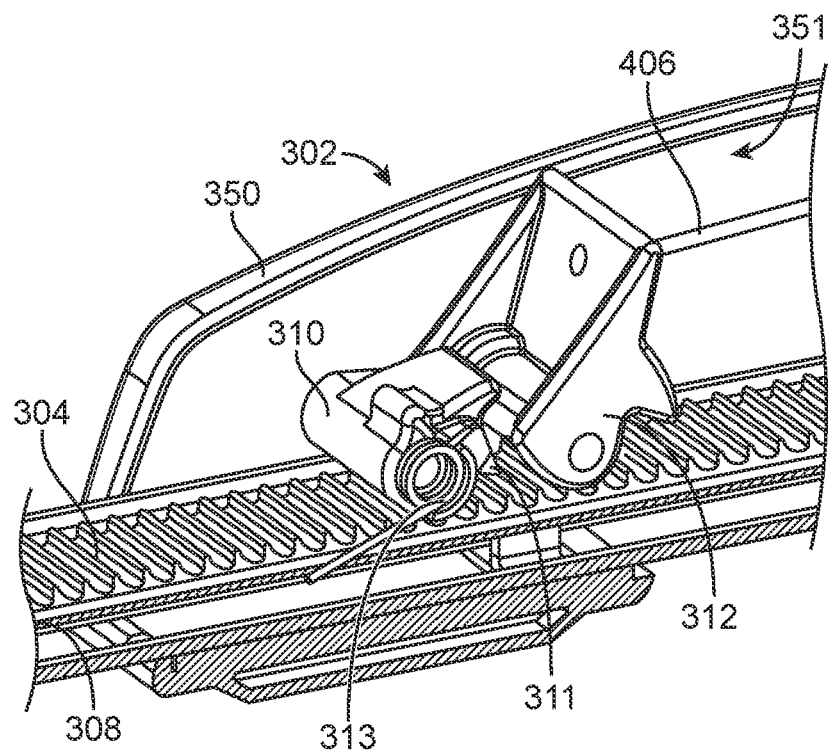
FIGS. 8A and 8B illustrate a ratcheting assembly for a bicycle carrier, according to an embodiment.
Figure 8B:
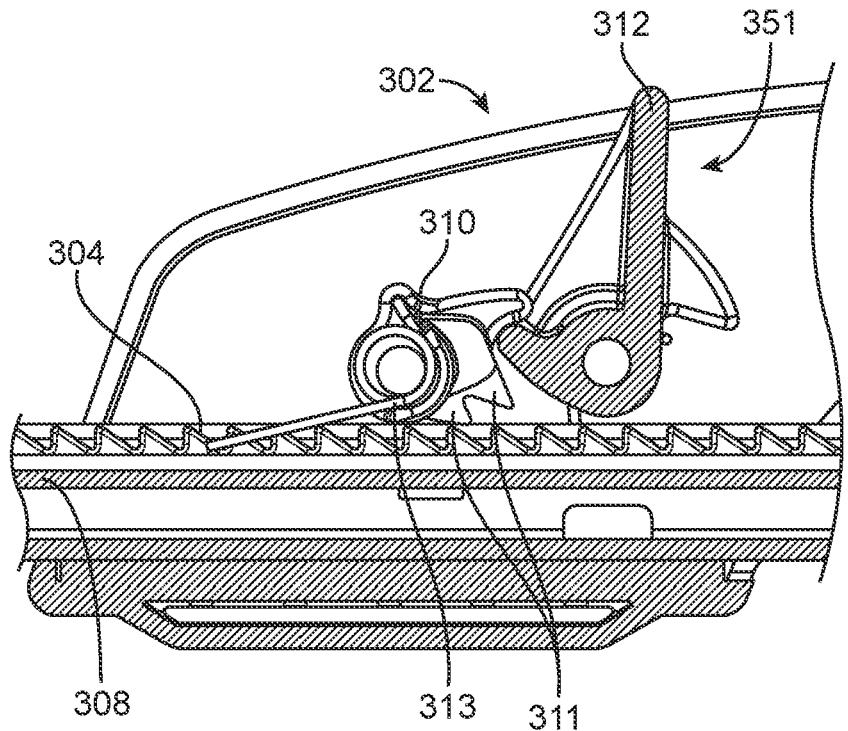

FIGS. 8A and 8B illustrate ratcheting assembly 302 in a disengaged configuration, where actuation member 400 is actuated by a user. For example, by pulling handle 402, cable 406 can be pulled in a direction of distal end 320 of ratchet arm 300 thereby causing release 312 to rotate pawl 310, which disengages teeth 311 from toothed surface 304. This allows wheel securement arm 200 to rotate about first joint 206 in direction R1 (see FIG. 2).

In some embodiments, cable 406 or other linkage 404 can be disposed within an interior 351 of housing 350 and within an interior 240 of wheel securement arm 200. This can prevent objects from becoming caught in cable 406. In such embodiments, cable 406 is not visible from an exterior of bicycle carrier 100. For example, FIGS. 9, 10A, 10B, and 11 illustrate a pathway for cable 406 within the interiors of housing 350 and wheel securement arm 200. In some embodiments, this pathway can include a tube 408 disposed within housing 350 to facilitate cable 406 making a turn from housing 350 into wheel securement arm 200 without becoming twisted. In some embodiments, tube 408 can be a resilient material resistant to bending and twisting (e.g., metal or plastic) to prevent cable 406 from becoming kinked. In some embodiments, tube 408 can include a bend having a 90 degree angle.

In some embodiments, tube 408 can be disposed within housing 350 at third joint 356. In some embodiments, housing 350 can include a slot 352 through which cable 406 can pass from the interior 351 of housing 350 into the interior 240 of wheel securement arm 200. In some embodiments, slot 352 can be formed in an end cap 353 of housing 350 disposed between housing 350 and wheel securement arm 200. In some embodiments, slot 352 can be a radial slot. In some embodiments, slot 352 can extend up to 90 degrees along a circumference.

Figure 10A:
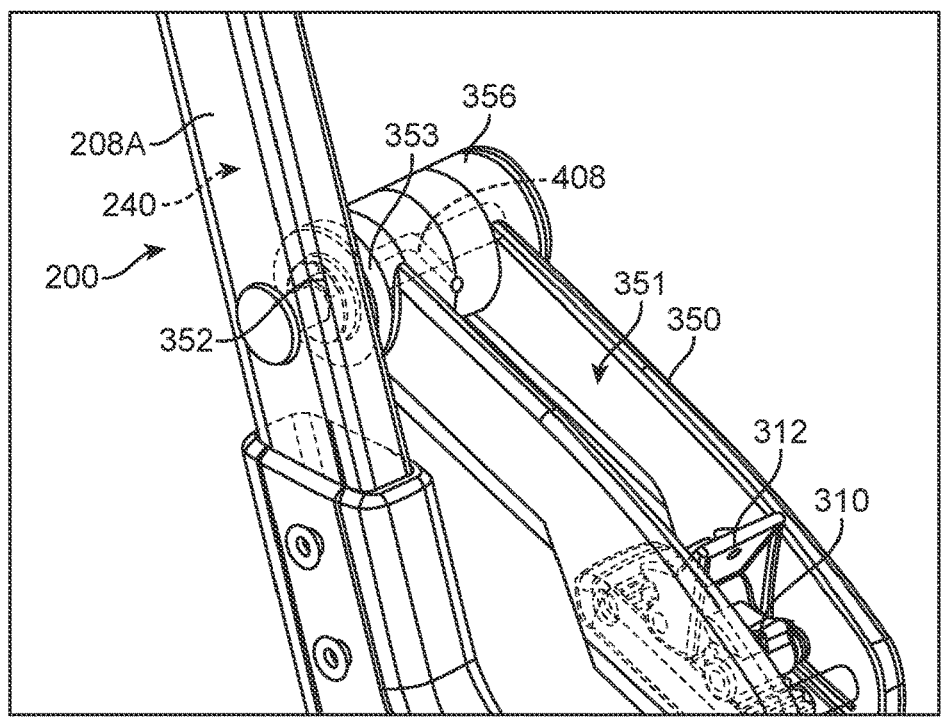
FIGS. 10A and 10B illustrate partial interior views of portions of a bicycle carrier, according to an embodiment.
Figure 10B:
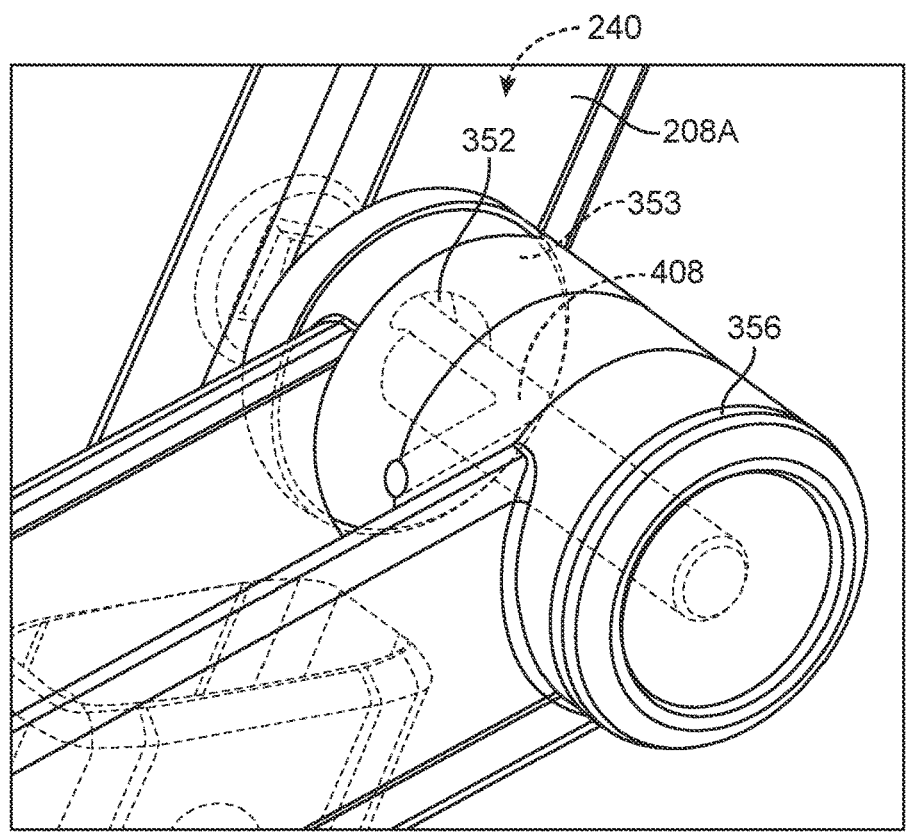

As shown, for example, in FIGS. 10A and 10B when wheel securement arm 200 is in loading position 30, tube 408 can be disposed at a first end of slot 352. As wheel securement arm 200 is rotated to the closed position 10, slot 352 rotates around tube 408 until tube 408 is disposed at second end of slot 352, as shown in FIG. 11. This can allow wheel securement arm 200 to rotate from the closed position 10 to the loading position 30, and vice versa, without cable 406 becoming kinked.

Figure 19A:
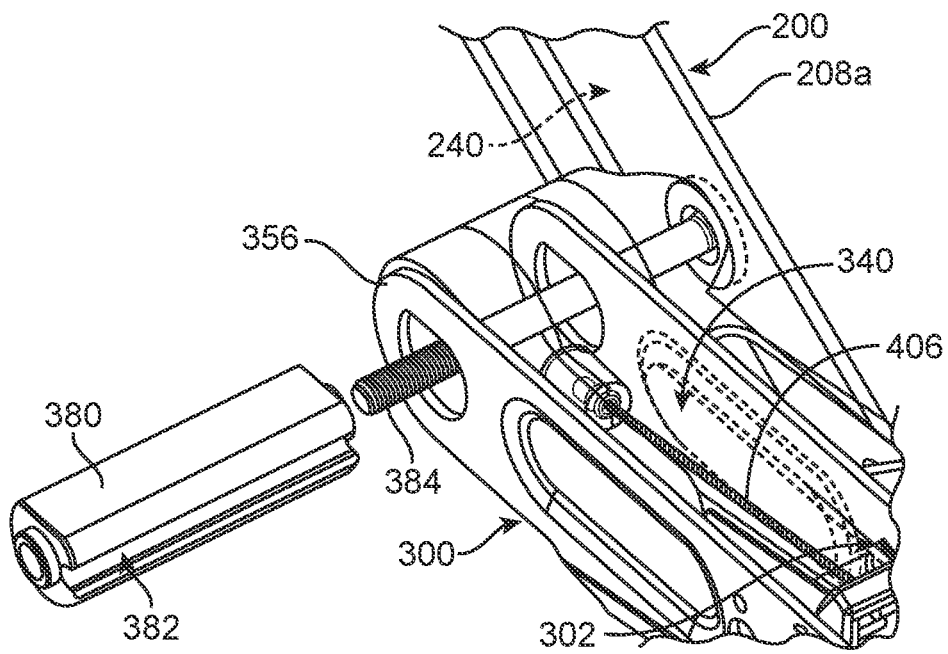
FIGS. 19A and 19B illustrate partial interior views of portions of a bicycle carrier, according to an embodiment.
Figure 19B:
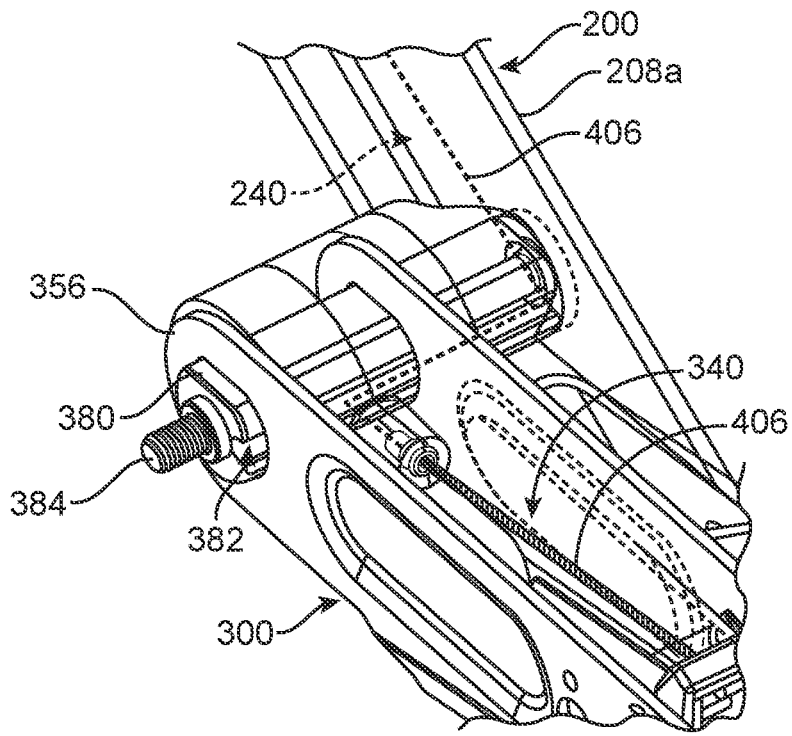

In some embodiments, as shown in FIGS. 19A and 19B, pivot tube 380 can be used to prevent cable 406 from becoming kinked. For example, pivot tube 380 can include groove 382, or other internal or external pathway, providing a large surface area along which cable 406 can be disposed from ratchet arm 300 to wheel securement arm 200. In some embodiments, pivot tube 380 can be disposed about a pin 384 coupling wheel securement arm 200 and ratchet arm 300, for example, at third joint 356. Thus, cable 406 can run within interior 340 of ratchet arm 300, within groove 382 of pivot tube 380, and into interior 240 of upright 208A of wheel securement arm 200.

Figure 12A:
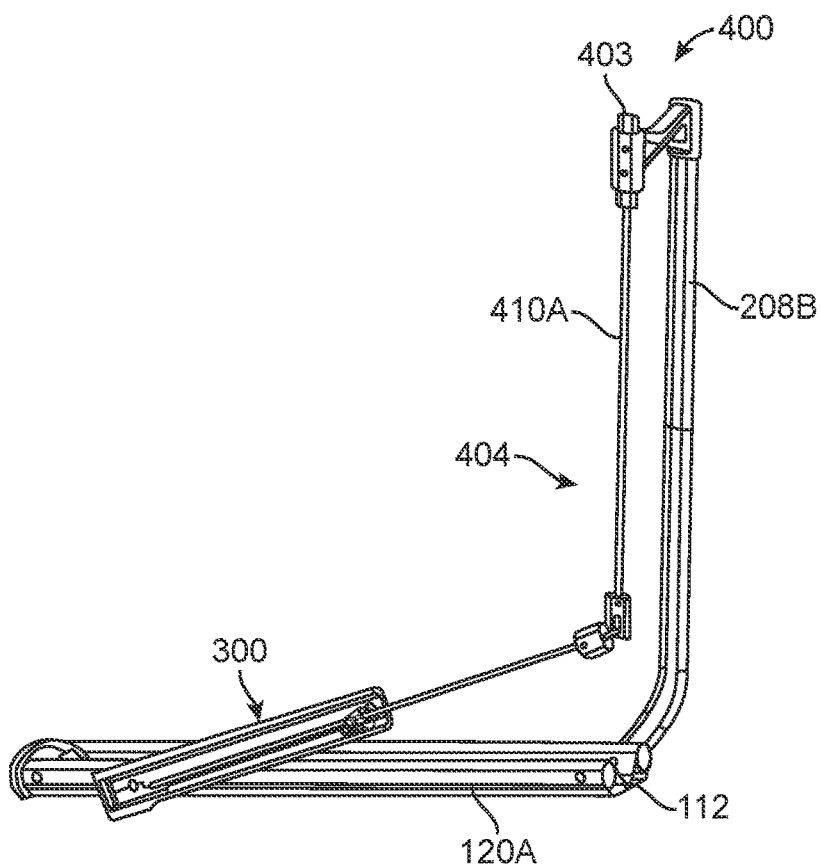
FIGS. 12A and 12B illustrate a linkage for a bicycle carrier, according to an embodiment.
Figure 12B:
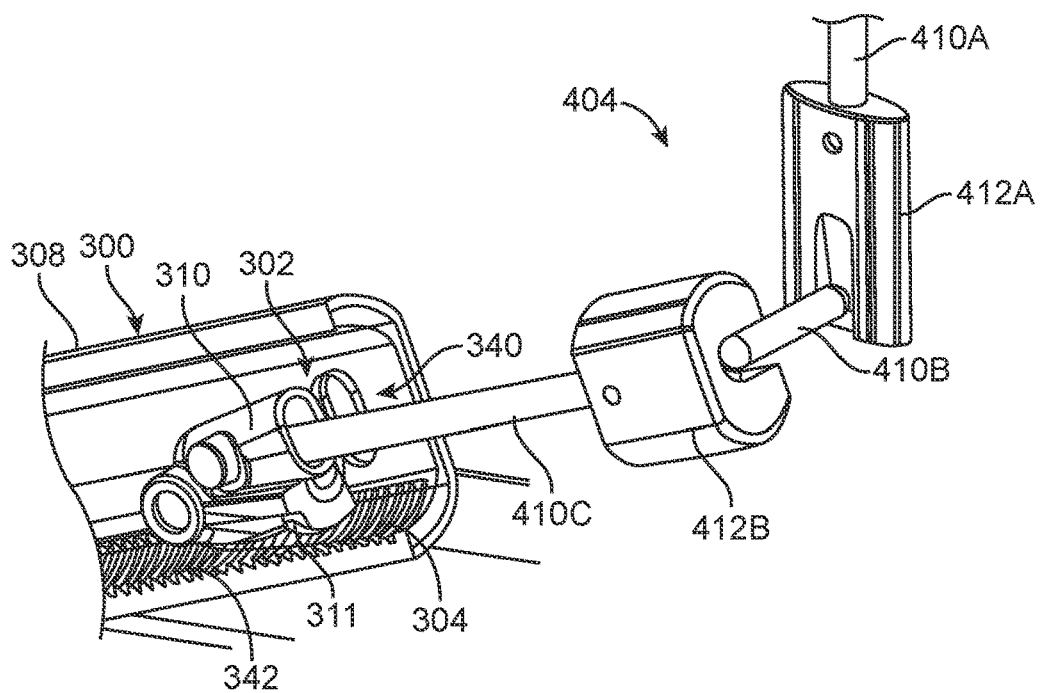

FIGS. 12A and 12B illustrate a linkage 404 between actuation member 400 and ratcheting assembly 302, according to an embodiment of bicycle carrier 100. In some embodiments, actuation member 400 can be a button 403, as shown in FIG. 12A. In some embodiments, actuation member 400 can be coupled with ratcheting assembly 302 by way of linkage 404, which can include rods 410A-C. Rod 410A can be coupled to button 403 and extend along a length within wheel securement arm 200. In some embodiments, rod 410A can be coupled to wedge 412A. Wedge 412A can be coupled to transition rod 410B, which can in turn be coupled to wedge 412B. Transition rod 410B can be disposed at an angle between rod 410A and rod 410C. Further, wedge 412B can be coupled to rod 410C, which can in turn be coupled with ratcheting assembly 302, for example, with pawl 310. By engaging button 303, for example, by pushing downward on button 303, rod 410A travels downward and wedge 412A eases the transition rod 410B into wedge 412B, which translates rod 410C, thereby disengaging the one or more teeth 311 of pawl 310 from toothed surface 304. This can allow wheel securement arm 200 to rotate as described above. As. As also shown, for example, in FIG. 12B, in some embodiments, ratcheting assembly 302 can be disposed within an interior 340 of ratchet arm 300. In some embodiments, toothed surface 304 can be integrally formed with an interior surface 342 of ratchet arm 300.

Figure 13A:
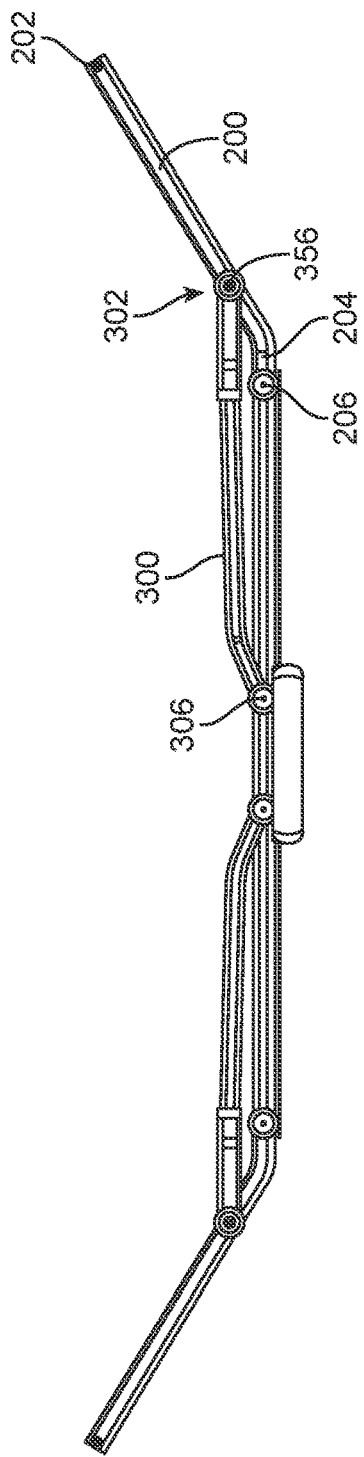
FIGS. 13A and 13B illustrate a front view of a bicycle carrier, according to an embodiment.
Figure 13B:
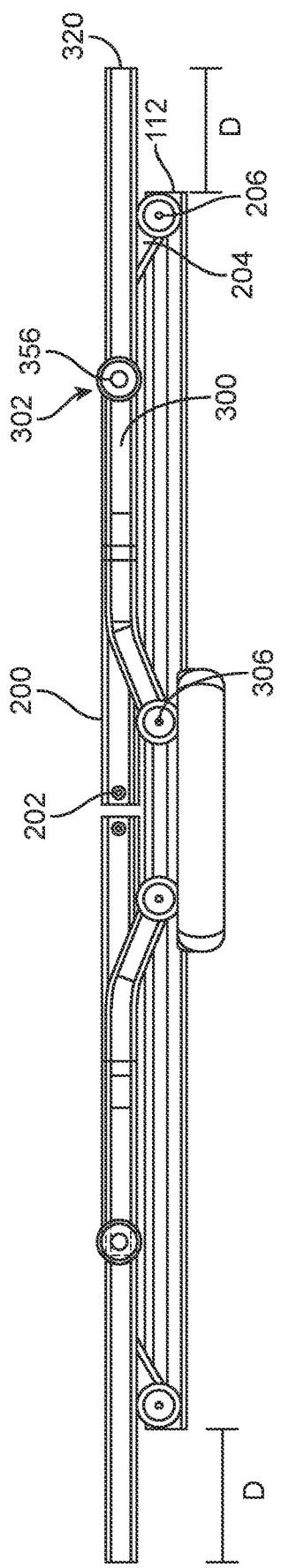

FIGS. 13A and 13B illustrate bicycle carrier 100 according to an embodiment. In this embodiment, ratcheting assembly 302 is disposed at third joint 356. As shown in FIG. 13B, when wheel securement arm 200 is rotated to the closed position 10, a distal end 320 of ratchet arm 300 overhangs first end 112 of base 110 by a distance D. This increases the overall space occupied by the bicycle carrier in the closed position 10.

In comparison, FIGS. 14A and 14B illustrate an embodiment of bicycle carrier 100 where ratcheting assembly 302 is disposed between third joint 356 and second joint 306 of ratchet arm 300. As shown in FIG. 14B, in the closed position 10, distal end 320 of ratchet arm 300 overhangs first end 112 of base 110 by a shorter distance d than the embodiment of FIGS. 13A and 13B. In some embodiments, as shown in FIG. 1, the ratcheting assembly can be disposed such that the distal end 320 of ratchet arm 300 is even with or shorter than first end 112 in the closed position 10.

FIGS. 15A and 15B illustrate bicycle carrier 100, according to an embodiment. As shown in FIGS. 15A and 15B, ratchet arm 300 can be a telescoping arm having a first telescoping part 372 and a second telescoping part 374. In some embodiments, toothed surface 304 can be located on an exterior side of ratchet arm 300, for example, on an exterior side of second telescoping part 374. In some embodiments, release 312 can be disposed on first telescoping part 372 such that a user can manipulate release 312 to disengage the ratcheting assembly 302. When ratcheting assembly 302 is disengaged, the wheel securement arm 200 can be rotated into the loading position 30 as shown, for example, in FIG. 15A. The wheel securement arm 200 can also be rotated into the closed position 10, whereby a portion of second telescoping part 374 can translate through an opening 370 in third joint 356.

Figure 16:
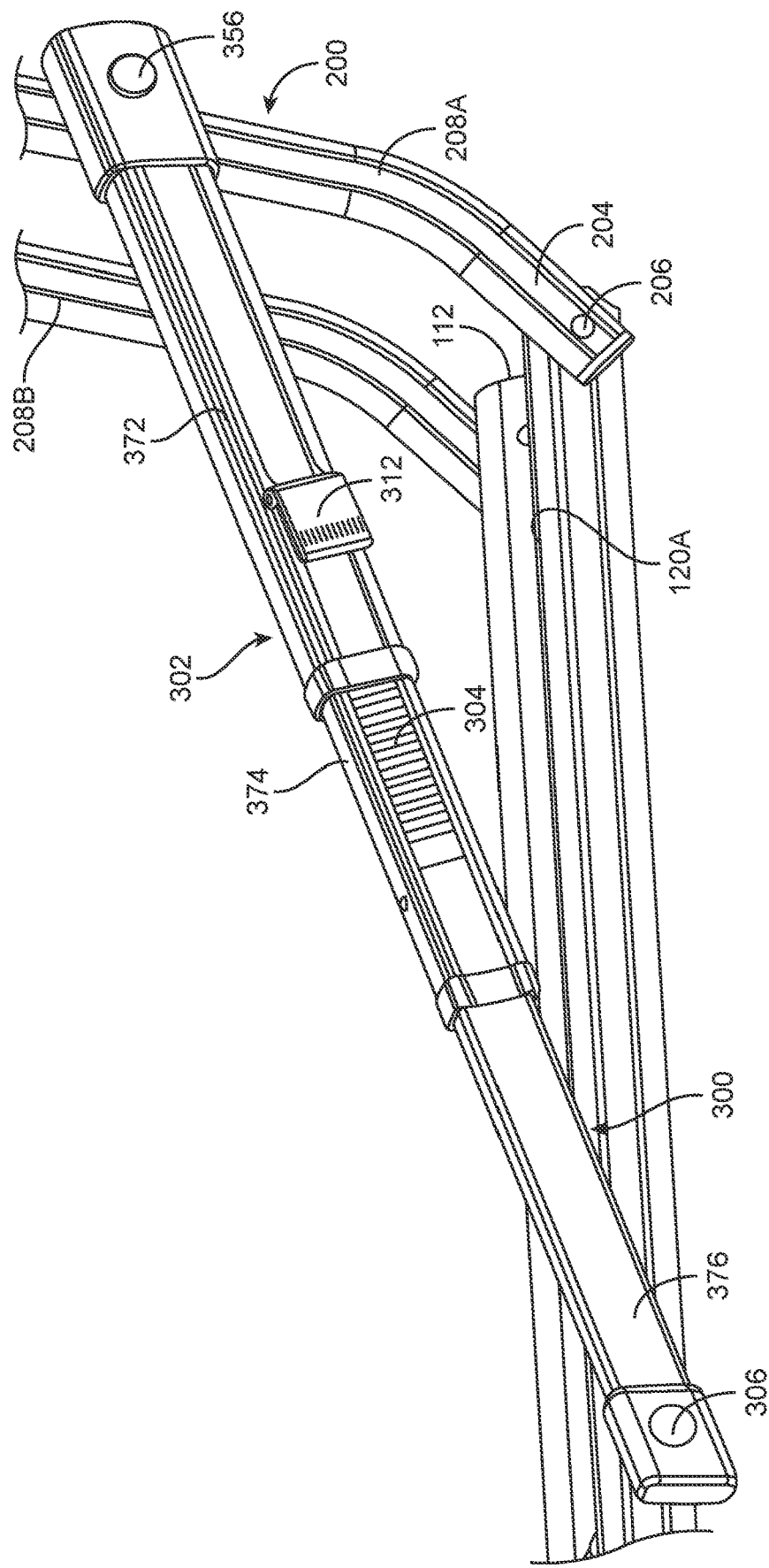
FIG. 16 illustrates a portion of a bicycle carrier, according to an embodiment.

FIG. 16 illustrates a portion of a bicycle carrier 100, according to an embodiment. In FIG. 16, ratchet arm 300 includes first telescoping part 372, second telescoping part 374, and third telescoping part 376. In some embodiments, second telescoping part 374 can include a toothed surface 304 and first telescoping part 372 can include release 312 for ratcheting assembly 302. Ratcheting assembly 302 can function in the same way as described with respect to FIGS. 15A and 15B.

Figure 17:
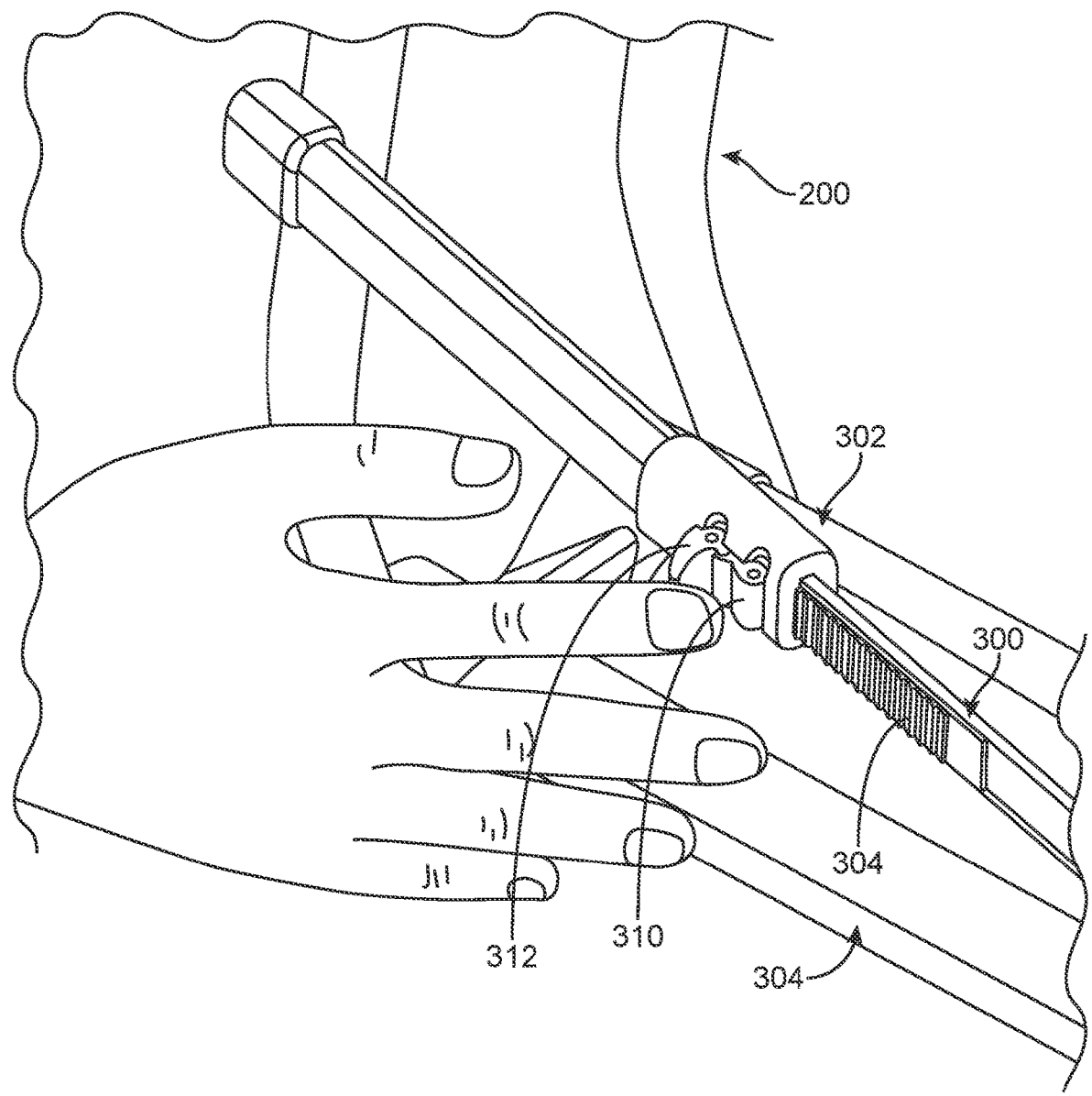
FIG. 17 illustrates a portion of a bicycle carrier, according to an embodiment.

FIG. 17 illustrates an embodiment of ratcheting assembly 302 which can be included, for example, in the embodiments illustrated in FIGS. 15A-B and FIG. 16. For example, ratcheting assembly 302 can include a release 312 configured to disengage a pawl 310 when release 312 is operated by a user. When pawl 310 is disengaged from toothed surface 304, the first telescoping part 372 can slide through the second telescoping part 374.

Figure 18:
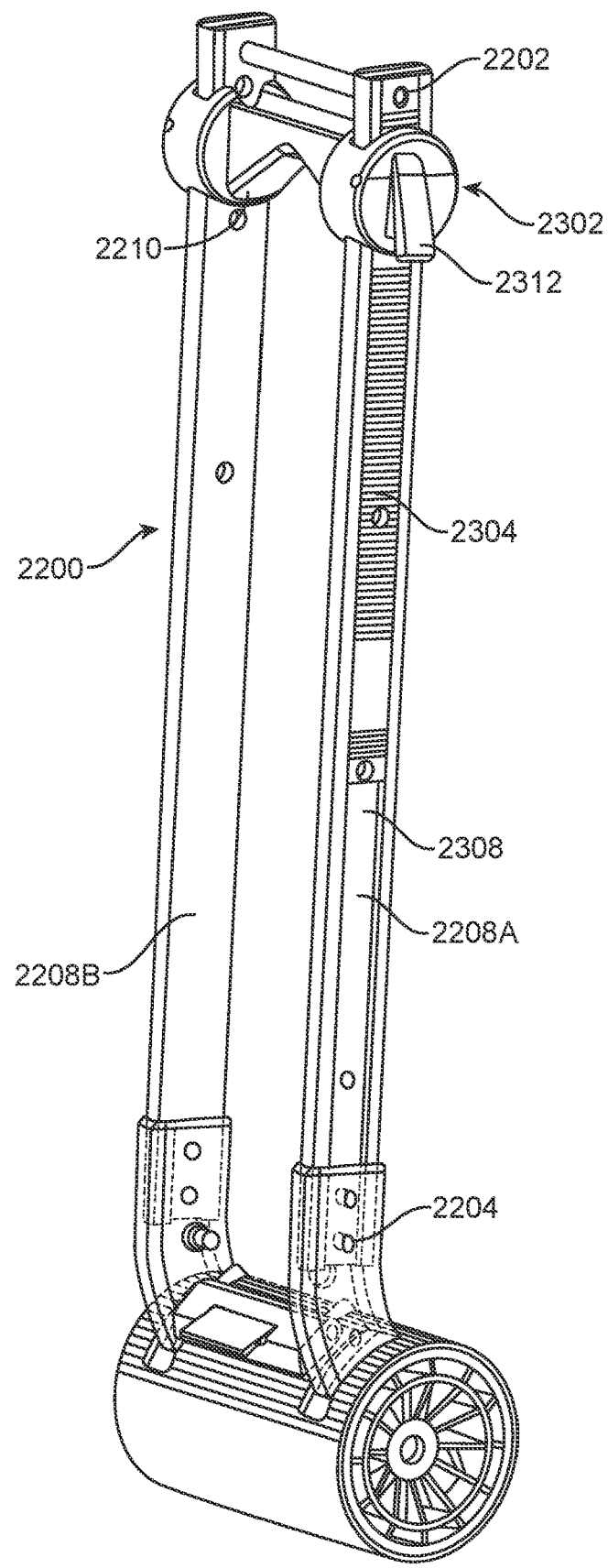
FIG. 18 illustrates a wheel securement arm, according to an embodiment.

FIG. 18 illustrates wheel securement arm 200 of bicycle carrier 100, according to an embodiment. In some embodiments, wheel securement arm 200 can include an adjustable wheel engagement surface 2210. For example, wheel engagement surface 2210 can slide along wheel securement arm 200. For example, wheel engagement surface 2210 can be coupled to wheel securement arm 200 by a ratcheting assembly 2302. Ratcheting assembly 2302 can include, for example, a release 2312 configured to disengage teeth from a toothed surface 2304 disposed on an exterior surface 2308 of an upright 2208A and/or 2208B. This can allow for incremental adjustments of the wheel engagement surface 2210 to accommodate different diameter wheels within wheel securement arm 2200.

It is to be appreciated that the Detailed Description section, and not the Brief Summary and Abstract sections, is intended to be used to interpret the claims. The Summary and Abstract sections may set forth one or more but not all exemplary embodiments of bicycle carriers and methods as contemplated by the inventors, and thus, are not intended to limit the present embodiments and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments, but should be defined only in accordance with the following claims and their equivalents.

What is claimed is:

1. A bicycle carrier, comprising:
    a base configured to support a bicycle;
    a wheel securement arm having a free end and a fixed end, wherein the fixed end is rotatably coupled to the base; and
    a connection assembly coupled to the wheel securement arm and fixed to the base, the connection assembly being configured to rotate the wheel securement arm about the base,
    wherein the connection assembly comprises a housing and a telescoping arm, and wherein a distal end of the telescoping arm is disposed within the housing;
    wherein the housing comprises a ratcheting assembly.

2. The bicycle carrier of claim 1, wherein the base comprises a first end and a second end, and wherein the fixed end of the wheel securement arm is coupled to the first end of the base.

3. The bicycle carrier of claim 1, wherein the ratcheting assembly is configured to engage a toothed surface.

4. The bicycle carrier of claim 3, wherein the toothed surface is disposed on an exterior surface of the telescoping arm.

5. The bicycle carrier of claim 4, wherein the toothed surface is disposed on an underside of the exterior surface.

6. The bicycle carrier of claim 1, wherein the connection assembly is coupled to the base by a housing.

7. The bicycle carrier of claim 6, wherein the ratcheting assembly is disposed within the housing.

8. The bicycle carrier of claim 1, further comprising an actuation member coupled to the connection assembly.

9. The bicycle carrier of claim 8, wherein the actuation member comprises a lever configured to release the connection assembly and thereby allow rotation of the wheel securement arm.

10. The bicycle carrier of claim 8, wherein the actuation member comprises a knob, a button, a handle, or a combination thereof.

11. The bicycle carrier of claim 1, further comprising a stinger coupled to the base and configured to couple the bicycle carrier to a vehicle hitch.

12. The bicycle carrier of claim 1, wherein the housing is rotatably coupled to the base and the telescoping arm is rotatably coupled to the wheel securement arm.

13. The bicycle carrier of claim 1, wherein the wheel securement arm is configured to rotate between a closed configuration and a loading configuration relative to the base, and wherein the distal end of the telescoping arm is disposed within the housing in the closed configuration and in the loading configuration.

14. The bicycle carrier of claim 1, wherein a ratcheting assembly is disposed within the housing and is configured to engage a toothed surface disposed on the telescoping arm.

15. A bicycle carrier, comprising:
    a base configured to support a bicycle, the base comprising a first end and a second end;
    a wheel securement arm having a free end and a fixed end, wherein the fixed end is rotatably coupled to the first end of the base at a first attachment point; and
    a ratchet arm rotatably coupled to the base at a second attachment point and coupled to the wheel securement arm at a third attachment point, the ratchet arm comprising a housing and a telescoping arm,
    wherein, in a closed configuration, the third attachment point is disposed longitudinally between the first attachment point and the second attachment point, and an end of the telescoping arm is disposed within the housing, and wherein, in a loading configuration, the first attachment point is disposed longitudinally between the second attachment point and the third attachment point, and the end of the telescoping arm is disposed within the housing.

16. The bicycle carrier of claim 15, wherein, in the loading configuration, a length of the ratchet arm from the second attachment point to the third attachment point is greater than in the closed configuration.

17. The bicycle carrier of claim 15, further comprising an actuation member coupled to the ratchet arm and configured to release the ratchet arm thereby allowing for translating the ratchet arm from the closed configuration to the loading configuration.

18. A method of operating a bicycle carrier, comprising:
engaging an actuation member, wherein engaging the actuation member disengages a ratcheting assembly coupled to a ratchet arm; and
rotating a wheel securement arm coupled to the ratchet arm in a first direction about an attachment point between a closed configuration and a loading configuration,
wherein rotating the wheel securement arm in the first direction increases a length of the ratchet arm, and
wherein the ratchet arm includes a first telescoping part and a second telescoping part coupled to the first telescoping part and configured to translate within the first telescoping part such that an end of the second telescoping part is disposed within the first telescoping part when the wheel securement arm is rotated between the closed configuration and the loading configuration.

19. The method of claim 18, wherein the engaging the actuation member allows for translating the ratchet arm thereby allowing rotation of the wheel securement arm.

20. The method of claim 18, further comprising:
rotating the wheel securement arm in a second direction to contact a bicycle wheel with the wheel securement arm.

21. A bicycle carrier, comprising:
a base configured to support a bicycle;
a wheel securement arm having a free end and a fixed end, wherein the fixed end is rotatably coupled to the base and configured to rotate between a closed configuration and a loading configuration relative to the base;
a ratchet arm having a first fixed end rotatably coupled to the wheel securement arm and a second fixed end rotatably coupled to the base, wherein the ratchet arm comprises:
 a first telescoping part, wherein an end of the first telescoping part is fixed to the wheel securement arm or the base; and
 a second telescoping part coupled to the first telescoping part and configured to translate within the first telescoping part, wherein an end of the second telescoping part is disposed within the first telescoping part when the wheel securement arm is rotated between the closed configuration and the loading configuration; and
an actuation member configured to release the ratchet arm and thereby allow rotation of the wheel securement arm between the closed configuration and the loading configuration, wherein the actuation member is disposed on the first telescoping part.

22. The bicycle carrier of claim 21, wherein the first telescoping part comprises a ratcheting assembly configured to engage a toothed surface of the second telescoping part.

* * * * *